(12) United States Patent
Acharya et al.

(10) Patent No.: US 9,564,175 B2
(45) Date of Patent: *Feb. 7, 2017

(54) CLUSTERING CROWDSOURCED VIDEOS BY LINE-OF-SIGHT

(71) Applicant: INTERNATIONAL BUSINESS MACHINES CORPORATION, Armonk, NY (US)

(72) Inventors: Arup Acharya, Yorktown Heights, NY (US); Kirk A. Beaty, Yorktown Heights, NY (US); Puneet Jain, Yorktown Heights, NY (US); Justin G. Manweiler, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 231 days.

This patent is subject to a terminal disclaimer.

(21) Appl. No.: 13/855,253

(22) Filed: Apr. 2, 2013

(65) Prior Publication Data

US 2014/0294361 A1 Oct. 2, 2014

(51) Int. Cl.
*G06T 15/06* (2011.01)
*G11B 27/10* (2006.01)
(Continued)

(52) U.S. Cl.
CPC ........... *G11B 27/10* (2013.01); *G06K 9/00201* (2013.01); *G06K 9/00664* (2013.01); *G06T 7/0024* (2013.01); *G06T 7/0042* (2013.01); *G06T 7/0071* (2013.01); *G06T 17/00* (2013.01); *G11B 27/28* (2013.01); *G06T 2200/04* (2013.01); *G06T 2207/10016* (2013.01); *G06T 2207/30196* (2013.01); *G06T 2207/30221* (2013.01); *G06T 2207/30244* (2013.01)

(58) Field of Classification Search
USPC .......................................... 386/241
See application file for complete search history.

(56) References Cited

U.S. PATENT DOCUMENTS 7,352,386 B1 * 4/2008 Shum .................... G06T 7/0071
348/42
8,416,240 B1 * 4/2013 Kuffner, Jr. ....... G06F 17/30047
345/426

(Continued)

OTHER PUBLICATIONS

Christian Heipke: "Crowdsourcing geospatial data"; Aug. 12, 2010; (ISPRS Journal of Photogrammetry and Remote Sensing 65), Germany, pp. 550-557.*

(Continued)

*Primary Examiner* — Jamie Atala
*Assistant Examiner* — Patrick Demosky
(74) *Attorney, Agent, or Firm* — F. Chau & Associates, LLC

(57) ABSTRACT

A method for clustering images includes acquiring initial image data including a scene of interest. A 3D model is constructed of the scene of interest based on the acquired initial image data. Additional image data including the scene of interest is acquired. The additional image data is fitted to the 3D model. A line-of-sight of the additional image data is estimated based on the fitting to the 3D model. The additional image data is clustered according to the estimated line-of-sight.

18 Claims, 7 Drawing Sheets

(51) Int. Cl.
*G06T 7/00* (2006.01)
*G06T 17/00* (2006.01)
*G06K 9/00* (2006.01)
*G11B 27/28* (2006.01)

(56) References Cited

U.S. PATENT DOCUMENTS

| | | | | |
|---|---|---|---|---|
| 8,527,340 | B2* | 9/2013 | Fisher | G06Q 30/02 |
| | | | | 455/456.1 |
| 8,774,520 | B2* | 7/2014 | Ofek | G06K 9/3233 |
| | | | | 382/190 |
| 8,880,535 | B1* | 11/2014 | Agarwal | G06F 17/30265 |
| | | | | 707/748 |
| 2003/0214533 | A1* | 11/2003 | Cull | G09B 9/302 |
| | | | | 715/771 |
| 2004/0002642 | A1* | 1/2004 | Dekel | A61B 19/5244 |
| | | | | 600/407 |
| 2007/0185946 | A1 | 8/2007 | Basri et al. | |
| 2007/0279494 | A1 | 12/2007 | Aman et al. | |
| 2008/0024484 | A1* | 1/2008 | Naimark | G06T 7/0028 |
| | | | | 345/419 |
| 2009/0046152 | A1* | 2/2009 | Aman | A63B 24/0021 |
| | | | | 348/157 |
| 2010/0284607 | A1* | 11/2010 | Van Den Hengel | G06T 7/0067 |
| | | | | 382/154 |
| 2011/0034176 | A1* | 2/2011 | Lord | G06F 17/30244 |
| | | | | 455/450 |
| 2011/0136502 | A1 | 6/2011 | Hubner et al. | |
| 2011/0173214 | A1 | 7/2011 | Karim | |
| 2012/0063668 | A1* | 3/2012 | Zalmanson | G01C 11/04 |
| | | | | 382/154 |
| 2012/0183230 | A1 | 7/2012 | Lopez et al. | |

OTHER PUBLICATIONS

Sexana et al., "3-D Reconstruction of Sparse Views Using Monocular Vision", IEEE 11th Int. Conference on Computer Vision, 2007 (ICCV 2007), Proceedings, Oct. 14-21, 2007 pp. 1-8.
Lucero et al., "Image Space: An Empirical Study of Geotagged Mobile Media Content Capture and Sharing", MindTrek '12, Oct. 3-5, 2012 published by ACM, pp. 187-194.
Pylvanainen et al., "Dynamic and Scalable Large Scale Image Reconstruction", IEEE Conference on Computer Vision and Pattern Recognition 2010 (CVPR '10), Jun. 13-18, 2010, pp. 406-413.
Hile, Harlan et al., "Landmark-Based Pedestrian Navigation from Collections of Geotagged Photos", Proceedings of the Mobile and Ubiquitous Multimedia 2008 (MUM '08), ACM, pp. 145-152.
IPCOM000222329D, "Method to Provide Correct Travel Path via Real-Time Photo Snaps", Sep. 25, 2012, 4 pages (W/cover page).
Pawlowicz, Leszek, "3D Textured Models From 2D Photos with PhotoFly", accessed Nov. 14, 2005.

\* cited by examiner

CLUSTERING CROWDSOURCED VIDEOS BY LINE-OF-SIGHT

BACKGROUND

1. Technical Field

The present disclosure relates to video clustering and, more specifically, to clustering crowdsourced videos by line-of-sight.

2. Discussion of Related Art

Mobile crowdsourced videos, which are videos captured and contributed by large groups of individuals, have remarkable value. Uploaded videos often present engaging, diverse, and comprehensive perspectives not captured by professional videographers. Broad appeal of user-uploaded videos has been widely confirmed: freely distributed on YouTube, by subscription on Vimeo, and to peers on Facebook/Google+. Unfortunately, user-generated multimedia can be difficult to organize; these services depend on manual tagging or machine-mineable viewer comments. While manual indexing can be effective for popular, well-documented videos, newer content and content not manually tagged, may be poorly searchable. Live video, or video that is acquired in near real-time is almost impossible to search for.

BRIEF SUMMARY

A method for clustering images includes acquiring initial image data including a scene of interest. A 3D model is constructed of the scene of interest based on the acquired initial image data. Additional image data including the scene of interest is acquired. The additional image data is fitted to the 3D model. A line-of-sight of the additional image data is estimated based on the fitting to the 3D model. The additional image data is clustered according to the estimated line-of-sight.

The 3D model may be constructed from the initial image data using structure from motion (SfM) processing. The initial image data may include a plurality of still or video images of the scene of interest. The plurality of still or video images may be acquired by a plurality of different users. The additional image data may include a plurality of still or video images of the scene of interest. The plurality of still or video images may be acquired by a plurality of different users. The additional image data may be fit to the 3D model using structure from motion (SfM) processing. The estimating of the line-of-sight of the additional image data may be based on the fitting to the 3D model is performed by the SfM processing. Clustering the additional image data according to the estimated line-of-sight may include establishing a visual metric for content similarity, rating discrete images of the additional image data according to the established metric, and grouping the discrete images according to closeness of the ratings.

Clustering the additional image data according to the estimated line-of-sight may include calculating a 3D cone or pyramid representing a field-of-view for a plurality of discrete images of the additional image data according to the estimated line-of-sight, determining an extent to which the 3D cones or pyramids for the plurality of discrete images overlap, and grouping the discrete images according to the calculated extent to which the 3D cones or pyramids for the plurality of discrete images overlap.

Fitting the additional image data to the 3D model may be performed entirely based on computer vision techniques. Fitting the additional image data to the 3D model may be performed based on computer vision techniques and sensor data from a plurality of mobile devices used to acquire the additional image data. The plurality of mobile devices may include smartphones, tablet computers, or wearable computers. The sensor data from the plurality of mobile devices may include gyroscope data, GPS data, compass data, or accelerometer data. The gyroscope data may be used in fitting the additional image data to the 3D model by performing dead-reckoning in-between interpolation of computer vision-based fitting.

The method may additionally include receiving a user query for image data pertaining to the scene of interest. One or more first still or video images of the scene of interest from the additional image data may be displayed. One or more second still or video images of the scene of interest from the additional image data that have been clustered with the first still or video images may be displayed.

A system for clustering images includes a plurality of mobile devices for acquiring an initial plurality of still or video images including a scene of interest, acquiring an additional plurality of still or video images including the scene of interest, and transmitting the acquired initial plurality of still or video images and the additional plurality of still or video images to a cloud-based server over a mobile data network. A computer system hosting the cloud-based server constructs a 3D model of the scene of interest based on the acquired initial plurality of still or video images, fits the additional plurality of still or video images to the 3D model, estimates a line-of-sight of the additional plurality of still or video images based on the fitting to the 3D model, and clusters the additional plurality of still or video images according to the estimated line-of-sight.

The computer may construct the 3D model from the initial plurality of still or video images using structure from motion (SfM) processing and may fit the additional plurality of still or video images to the 3D model, estimating a line-of-sight of the additional plurality of still or video images based on the fitting to the 3D model, using the SfM processing.

A computer program product for clustering images includes a computer readable storage medium having program code embodied therewith. The program code is readable/executable by a computer to acquire an initial plurality of still or video images including a scene of interest, acquire an additional plurality of still or video images including the scene of interest, transmit the acquired initial plurality of still or video images and the additional plurality of still or video images to a cloud-based server over a mobile data network, construct a 3D model of the scene of interest based on the acquired initial plurality of still or video images, fit the additional plurality of still or video images to the 3D model, estimate a line-of-sight of the additional plurality of still or video images based on the fitting to the 3D model, and cluster the additional plurality of still or video images according to the estimated line-of-sight.

The 3D model may be constructed from the initial plurality of still or video images using structure from motion (SfM) processing. The additional plurality of still or video images may be fitted to the 3D model, estimating a line-of-sight of the additional plurality of still or video images based on the fitting to the 3D model, using the SfM processing.

BRIEF DESCRIPTION OF THE SEVERAL VIEWS OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

Figure 1:
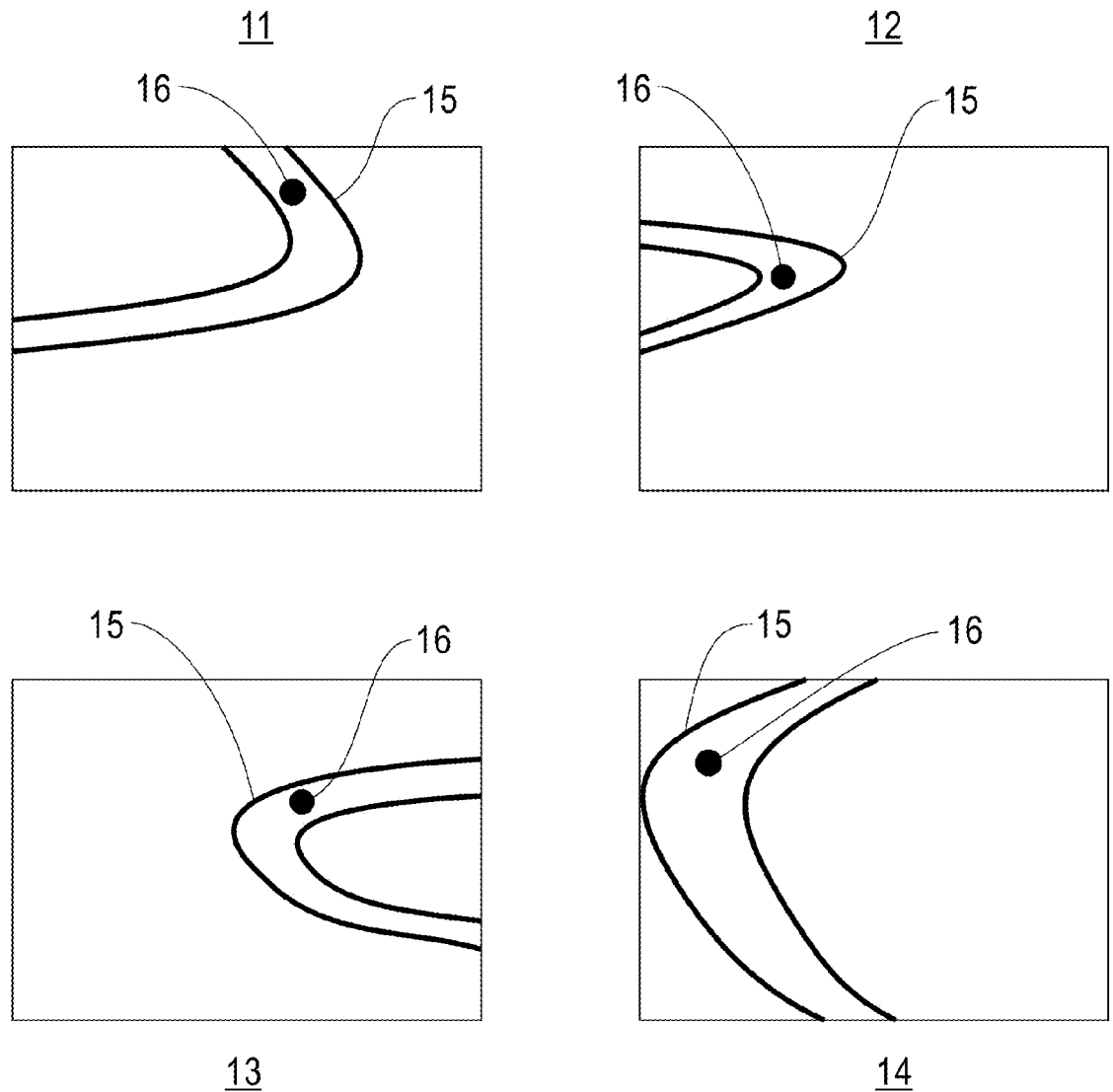
FIG. 1 is a set of illustrations showing how four pictures of a common subject athlete running around a track acquired at four different angles and distances may look relatively distinct even as they are considered to be "similar" in accordance with exemplary embodiments of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents, which operate in a similar manner.

Exemplary embodiments of the present invention seek to provide systems and methods for grouping and indexing still image and video feeds in real-time, and in particular, where the images and videos are provided by a large number of participants, for example, each using mobile electronic devices such as smartphones and tablet computers. This may be accomplished, for example, by implementing a video-sharing service for receiving live user video streams from each of the participants. The received videos may be indexed automatically and in real time. This service may utilize Hadoop-on-cloud video-analytics and may uniquely leverage Computer Vision and multimodal sensing to model and continuously track the subject matter of the videos and the line-of-sight from which each video is obtained. Then, spatial reasoning may be applied on the relative geometry of multiple live user video streams, extracting clusters of shared content, capturing the same subject. Understanding the precise angle and distance that each video was captured at relative to the subject (referred to herein as line-of-sight), exemplary embodiments of the present invention are able to recognize shared content when viewed from multiple angles and distances at high precision. This notion of line-of-sight similarity may be used in addition to notions of visual similarity to cluster the shared content.

With the near-ubiquity of modern Internet-enabled smartphones, and the growing prominence of wearable computing devices such as Google Glass and smart watches, which may be equipped with video recording devices, large numbers of users may be always ready to capture and share exciting or unexpected events. Shared video content may be highly valued by peers. Major news organizations have also embraced so-called "citizen journalism," such as CNN iReport, mixing amateur-sourced content with that of professionals, and TV broadcasting this content worldwide.

Amateur video need not be immediately newsworthy to be popular or valuable. Consider a sporting event in a crowded stadium. Often, in this case, a great number of spectators may wish to record video and still images on their smartphones. Even where this captured content is generally mundane, these videos may contain valuable information, capturing the unique perspective of the observer, and potentially missed by professional videographers, even if present. Unfortunately, given a multitude of sources, such video content is difficult to browse and search. The value can be lost due to a "needle in a haystack" effect. To provide some organization to user-provided content, existing approaches for sharing uploaded video such as websites like YouTube rely on a haphazard index of user-provided tags and comments. While useful, tags and comments require manual effort, may not be descriptive enough, are subject to human error, and may not be provided in real time and thus, are not amenable to live video streams. In contrast, exemplary embodiments of the present invention provide a system to extract content-specific metadata for live video streams, in real time. This metadata may be sufficient to immediately identify and form clusters of synchronized video streams with related content, for example, a precise subject.

Exemplary embodiments of the present invention provide a system and approach for real-time analysis and clustering of user-uploaded video streams, for example, when captured in nearby physical locations (e.g., in the same stadium, plaza, shopping mall, or theater). Exemplary embodiments of the present invention are able to deduce content similarity even when videos are taken from dramatically different perspectives. For example, two spectators in a soccer stadium may film a goal from the East and West stands, respectively. With up to 180 degrees of angular separation in their views, each spectator will capture a distinct background. Even the shared foreground subject, the goalkeeper, will look substantially different when observed over her left or right shoulder. Without a human understanding of the game, it would be difficult to correlate the East and West views of the goalkeeper, while distinguishing from other players on the field. Exemplary embodiments of the present invention analyze the relative camera location and orientation of two or more video streams. The geometric intersection of line-of-sight from multiple camera views is indicative of shared content. Thus, exemplary embodiments of the present invention are able to infer logical content similarity even when video streams contain little or no visual similarity.

Here, users may record and upload video using a specially tailored mobile phone application such as an application written for popular mobile phone and tablet computer operating environments, or a sophisticated Web App. The application or web app may automatically annotate the video content with precise GPS and/or mobile phone network-derived timestamps and contextual data from sensors, including GPS, electromagnetic compass, accelerometer, and/or inertial gyroscope. Each video stream arrives at a scalable service, designed for deployment on an infrastructure-as-a-service cloud, where, for example, a Hadoop-based pipeline performs a multi-sensory analysis. This analysis blends smartphone sensory inputs along with structure from motion ("SfM"), a state-of-the-art technique from Computer Vision. For each stream, exemplary embodiments of the present invention develop a model of the user's line-of-sight across time, understanding the geometry of the camera's view position and orientation, referred to herein as "pose" or "line-of-sight." Across multiple user streams, exemplary embodiments of the present invention consider video pairs, for example, frame by frame. For each pair, for each frame, commonality may be determined in their respective lines-of-site, and assigns a "similarity" score.

Across multiple feeds, across multiple frames, these scores feed a pairwise matrix across space and time ("spatiotemporal matrix") of content similarity. A form of clustering may then be applied on this matrix, utilizing processes from community identification in complex networks, returning groups with a shared subject.

For example, an interactive video streaming site for watching live user feeds of sporting and other high-attendance events may be provided. On a pictorial representation of a stadium, users may click to indicate what they want to see (e.g., a soccer player about to kick a ball, or the goalkeeper trying to block it), and from where in the stadium they would like to view it (e.g., towards, behind, or alongside the goal). Further, an enhanced "instant replay" system may be provided to allow the viewer to browse multiple angles of a contentious referee call. In other domains, exemplary embodiments of the present invention may be used by security personnel to track a suspicious person or parcel, or by a news organization to authenticate or corroborate a user-provided video report, by finding multiple perspectives on the same content.

Accordingly, exemplary embodiments of the present invention may provide:

Visual Similarity Analysis by Line-of-Sight: Here, computer vision techniques may be used to reason about the relative position and orientation of two or more videos, inferring shared content, and providing robustness against visual differences caused by distance or large angular separations between views.

Inertial Sensing for Real Time Tracking: To account for the computation latency of visual analysis, and to reduce the monetary cost of cloud deployment, exemplary embodiments of the present invention may utilize lightweight techniques based on smartphone sensors, as a form of dead reckoning, to provide continuous real-time video tracking, frame by frame.

Video Clustering by Modularity Maximization: To find groups of videos with shared content, exemplary embodiments of the present invention may apply techniques from community identification in complex networks on a spatiotemporal matrix of content similarity, derived from line-of-sight/field-of-view.

Cloud-Based Clustering Pipeline: A highly parallelized Hadoop-based pipeline may be implemented, for example, on the IBM SmartCloud framework, for enabling scalability and service elasticity with load variations.

User-generated, or crowdsourced, multimedia content may be understood to have high value. Video sharing sites like YouTube are immensely popular, as is video sharing on social networks like Facebook and Google+. The value of particular shared content, however, can be lost in volume, due to the difficulty of indexing multimedia content. On sharing websites today, user-generated "tags" or machine-mineable text comments aid peers in browsing and searching rich content. Newer and real-time content cannot benefit from this metadata. Accordingly, large-scale sharing of live user video from smartphones may not be easily discoverable within the framework of existing approaches.

Moreover, with the growing pervasiveness of smartphones and increasing use of social apps; the proliferation of 4G LTE connectivity and the still-growing ubiquity of Wi-Fi deployments; increased availability and adoption of scalable, cloud-based computation, useful for low-cost high-availability video processing and distribution; improving battery life, computational capabilities, enhanced sensing, and video quality of smartphones; there is great potential for a vast user base wishing and able to share real-time video.

Exemplary embodiments of the present invention seek to extract value from crowdsourced multimedia by enabling a reasonably straightforward means for finding live streams of interest, even at scales of hundreds, thousands, or even tens of thousands of simultaneous video streams. A system is provided to enable an organized presentation, especially designed for live user-uploaded video feeds. Contextual metadata, especially relating to the line-of-sight and subject in focus, is automatically extracted from captured video feeds. While this metadata can be used in various ways, exemplary embodiments of the present invention seek to classify or cluster streams according to similarity, a notion of shared content.

Accordingly, analysis of video similarity is performed automatically. A novel approach for characterizing similarity between pairs of video streams is provided herein. While there can be several understandings of "video similarity," exemplary embodiments of the present invention consider two videos streams to be more similar if, over a given period of time, a synchronized comparison of their constituent frames demonstrates greater "subject similarity." Two frames (still images) may be subject-similar depending on how exactly each frame captures the same physical object. For example, that physical object must be the subject, the focal intent of the videographer. By this definition, subject-similar clusters of live video streams can have several applications, depending on the domain. For example, in a sporting event, multiple videos from the same cluster could be used to capture disparate views of a contentious referee call, allowing a viewer to choose the most amenable angle of view thereby enabling a crowdsourced "instant replay." Multiple views of the same subject can aid identification and tracking of a suspicious person or lost child. For journalism, multiple views can be compared, vetting the integrity of a reported story.

According to one exemplary embodiment of the present invention, subject similarity may be determined by calculating a degree of shared volume between a cone or pyramid representing a first image line-of-sight and a cone or pyramid representing a second image line-of-sight. The bounds of each cone/pyramid may be set as the intersection of the planes that form the field of view for the given image.

This definition of similarity may be irrespective of the perspective of the video (e.g., the location from where the video is captured), so long as the foreground subject is the same. According to this definition of similarity, the angle of view and the distance from the subject need not be considered significant. For example, two videos of a particular athlete may share "similar" content, regardless of from which grandstand she is filmed. However, if these videos are captured from a wide angular separation, they may "look" quite distinct. Contingent on the angle of separation, the visual structure and color of an object or person, lighting conditions (especially due to the position of the sun early or late in the day), as well as the background, may vary considerably. Two "similar" views, as defined herein, may actually look quite different.

FIG. 1 is a set of illustrations showing how four pictures of a common subject athlete running around a track acquired at four different angles and distances may look relatively distinct even as they are considered to be "similar" in accordance with exemplary embodiments of the present invention. The first illustration 11 represents an image of an athlete 16 as she runs within a track 15. The first illustration 11 is taken from a participant/user from a first angle at a first distance. The second illustration 12 represents an image of the same athlete 16 in the same track 15 taken from a second angle at a second distance. The third illustration 13 represents an image of the same athlete 16 in the same track 15 taken from a third angle at a third distance. The fourth illustration 14 represents an image of the same athlete 16 in the same track 15 taken from a fourth angle at a fourth distance. Each of the first through fourth angles may be different and each of the first through fourth distances may be different. Two or more of the first through fourth angles may also be the same and two or more of the first through fourth distances may be the same. However, exemplary embodiments of the present invention may characterize all four view as "similar" even though their angles and distances may be different.

According to the instant approach, videos which look heterogeneous may be judged similar, if they share the same subject. Further, videos which look homogenous may be judged dissimilar, if their subjects are physically different. For example, videos that capture different buildings, but look homogenous due to repetitive architectural style, should not be considered similar. Thus, a system to judge similarity in accordance with exemplary embodiments of the present invention have a high certainty in deciding whether the object in a video's focus is truly the same precise subject in some other video.

Because, as defined herein, two videos that look quite different might be judged "similar," and two videos that look quite the same may be judged dis-similar, existing approaches for Computer Vision may be of limited use here. For example, histograms of image color content, spatiograms, and feature matching, are valuable for tracking an object across frames of a video. However, they are not intended to find similarity when comparing images that, fundamentally, may share little in common, visually. Superficial visual comparisons, while they may be useful and complementary to approaches of exemplary embodiments of the present invention, and appropriate under alternative notions of video similarity, may not be sufficient to the instant understanding of subject-based similarity.

Exemplary embodiments of the present invention judge similarity of a pair of videos utilizing a semantic understanding of the foreground object in view. For example, if it can be determined that the foreground captures the same person in each video, it may be deduced that these videos are highly similar. Using Computer Vision techniques for object identification, it may be determined whether two videos capture the same kind of object (e.g., person, tree, or bicycle). However, it would be difficult to say, precisely, that it is the exact same object, and not a nearby duplicate. At a sporting event, this level of differentiation would be required to isolate a particular athlete from teammates wearing identical uniforms. Further, at viewing distances from grandstands to the field, it would be unreliable to isolate unique physical characteristics. Again, while useful and appropriate in certain scenarios, similarity by object identification is not generic enough.

The definition of content similarity utilized herein makes use of a precise identification of a shared video subject. Without relying on a visual commonality or a semantic awareness of that shared object, one possible proxy is to recognize that a pair of videos capture some subject at the same physical location. When it is understand that two videos are looking towards the same location, at the same time, it is a strong indication that they are observing the same content. For example, the line-of-sight of a video, geometrically, a vector from the camera to the subject may each be considered. For example, the collinear infinite ray from the same point-of-origin and in the same direction may be considered. The geometric relationship of a pair of these rays reflects the similarity of the corresponding videos, at the corresponding precise instant in time. A maximally-similar pair of views will have line-of-sight rays that perfectly intersect. The intersection point will be within the volume of their mutual subject (e.g., person or building). Line-of-sight rays which do not nearly intersect will not be similar.

Figure 2A:
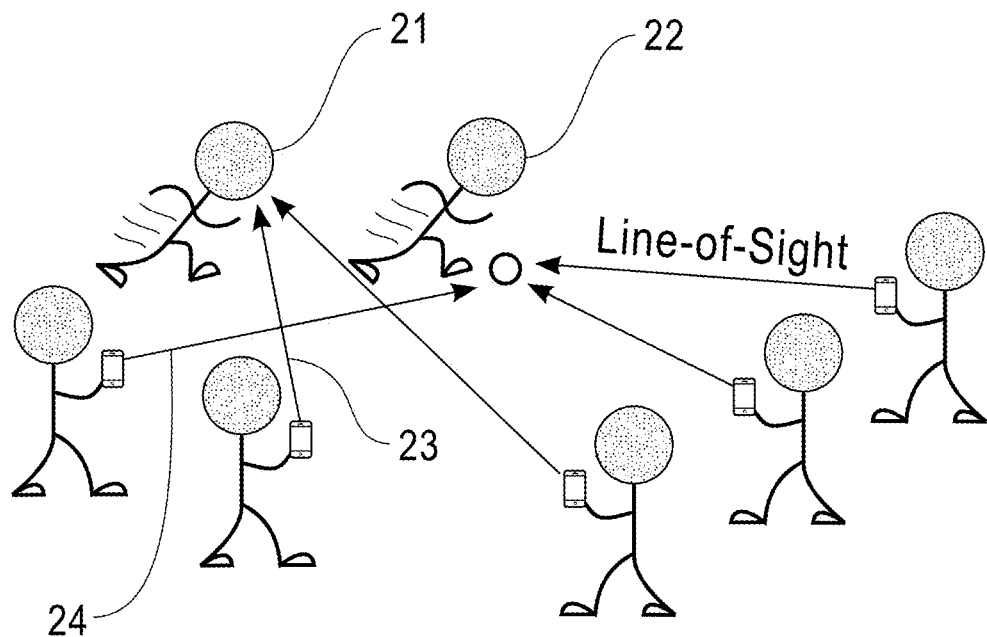
FIG. 2 is an illustration showing how multiple videos with intersecting line-of-sight rays suggest shared video content in accordance with exemplary embodiments of the present invention.
Figure 2B:
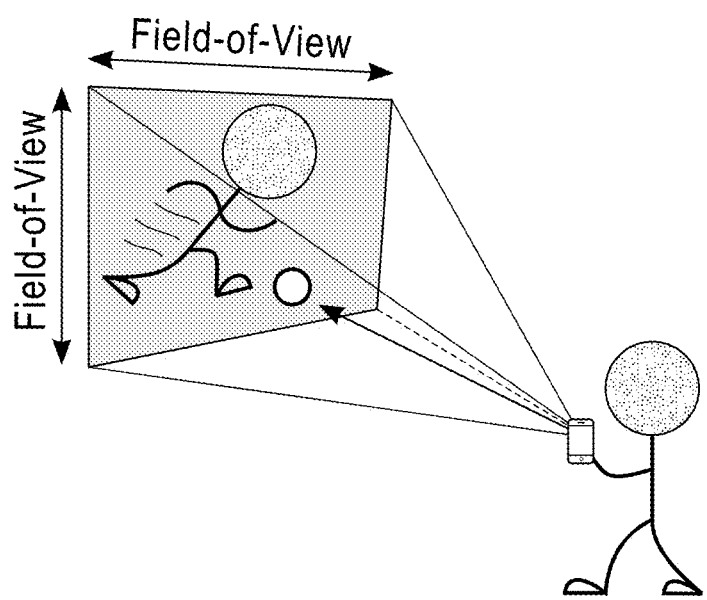

FIG. 2 is an illustration showing how multiple videos with intersecting line-of-sight rays suggest shared video content in accordance with exemplary embodiments of the present invention. Consistency across time reinforces the indication. In FIG. 2A, a pair of intersecting line-of-sight rays 22 and 23 does not guarantee shared video content. For example, here, ray 23 focuses on athlete 21 while ray 24 focuses on athlete 22. The subject in each video may appear in front of or behind the intersection point. Thus, inference of content similarity by line-of-sight is to be applied thoughtfully. In the disclosure below, various Computer Vision techniques are used to estimating the magnitude (and thus termination point) of a line-of-sight vector, substantially reducing the potential for false positive similarity judgments Exemplary embodiments of the present invention leverage Computer Vision and gyroscope-based dead-reckoning to construct 3D geometric equations for a video's line-of-sight, in a shared coordinate system. For example, four planes are defined per video frame to bound an infinite, pyramid-shaped volume of space, illustrated in FIG. 2B. The angular separation between these planes corresponds to the camera's field-of-view, horizontally and vertically, and is distributed symmetrically across the line-of-sight ray. Geometric and Computer Vision calculations may then be used to consider how thoroughly and consistently these pyramid-shaped volumes intersect to capture the same physical subject.

Accordingly, the geometric properties of the content observed in a video frame are understood according to line-of-sight and field-of-view. The geometric relationship between the content one video observes with that of others is then compared. If a pair of videos have a strong geometric overlap, indicating that they both capture the same subject, their content is judged to be "similar." Ultimately, groups of videos, sharing a common content, will be placed in self-similar groups, called clusters. Clusters are found through a technique called weighted modularity maximization, borrowed from community identification in complex networks. "Communities" of similar videos, derived from their geometric, or "spatial" relationship with time may then be found. Thus, live user videos streams are grouped based on a spatiotemporal metric of content similarity.

With the availability of sensors on a modern smartphone, it may seem straightforward to estimate a video's line-of-sight: GPS gives the initial position; compass provides orientation. Unfortunately, limited sensor quality and disruption from the environment (e.g., difficulty obtaining a high-precision GPS lock due to rain or cloud cover, presence of ferromagnetic material for compass) may make line-of-sight inferences error-prone and unsuitable for video similarity analysis. To understand the precision required, for example, consider a stadium grandstand. Only a few angular degrees separate players on a field. Typical compass imprecision may negate differentiation. Further, GPS may only be useful outdoors and thus applications in indoor sporting arenas, shopping malls, and auditoriums would be excluded. A sensing-only approach may still be valuable in some scenarios such as when outdoors and where limited precision is tolerable. In the disclosure below, GPS/compass/gyroscope sensor data is used for lightweight clustering, formulated to minimize the impact of compass imprecision.

Smartphone sensing is, in general, insufficient for estimating a video's line-of-sight. The content of video itself, however, presents unique opportunities to extract detailed line-of-sight context. Using geometry of multiple views from Computer Vision, the perspective from which an image has been captured may be estimated. If some known reference content in the image is found, it is possible to compare the reference to how it appears in the image, deducing the perspective at which the reference has been observed. At the most basic level, how large or small the reference appears is suggestive of from how far away it has been captured. Techniques for structure from motion may be used to enable analysis and inference of visual perspective, to reconstruct the geometry of a video line-of-sight.

Both smartphone sensing and Computer Vision provide complimentary and orthogonal approaches for estimating video line-of-sight. Exemplary embodiments of the present invention may therefore combine both approaches to provide high accuracy and indoor operability. Computational burden may be reduced within a Hadoop processing pipeline on the cloud by exploiting the inertial gyroscope and other sensors of the smartphones, where this data may be sufficient. Where the internal sensors are not sufficient to identify the angle, video-based analysis may be used in addition to the sensor data (including GPS, compass, and gyroscope).

An accurate analysis of content similarity across video streams should consider the video content itself as it most directly captures the intent of the videographer. Accordingly, exemplary embodiments of the present invention leverage these visual inputs to precisely estimate a video stream's line-of-sight. Geometric and sensory metadata provides context to inform a spatiotemporal clustering, derived from community identification, to find groups of subject-similar videos. While willing to exercise substantial computation, this approach emphasizes scalability, leveraging a cloud-based elastic architecture, and computational shortcuts, blending Computer Vision with inertial sensing inputs into a hybrid analysis pipeline.

Figure 3:
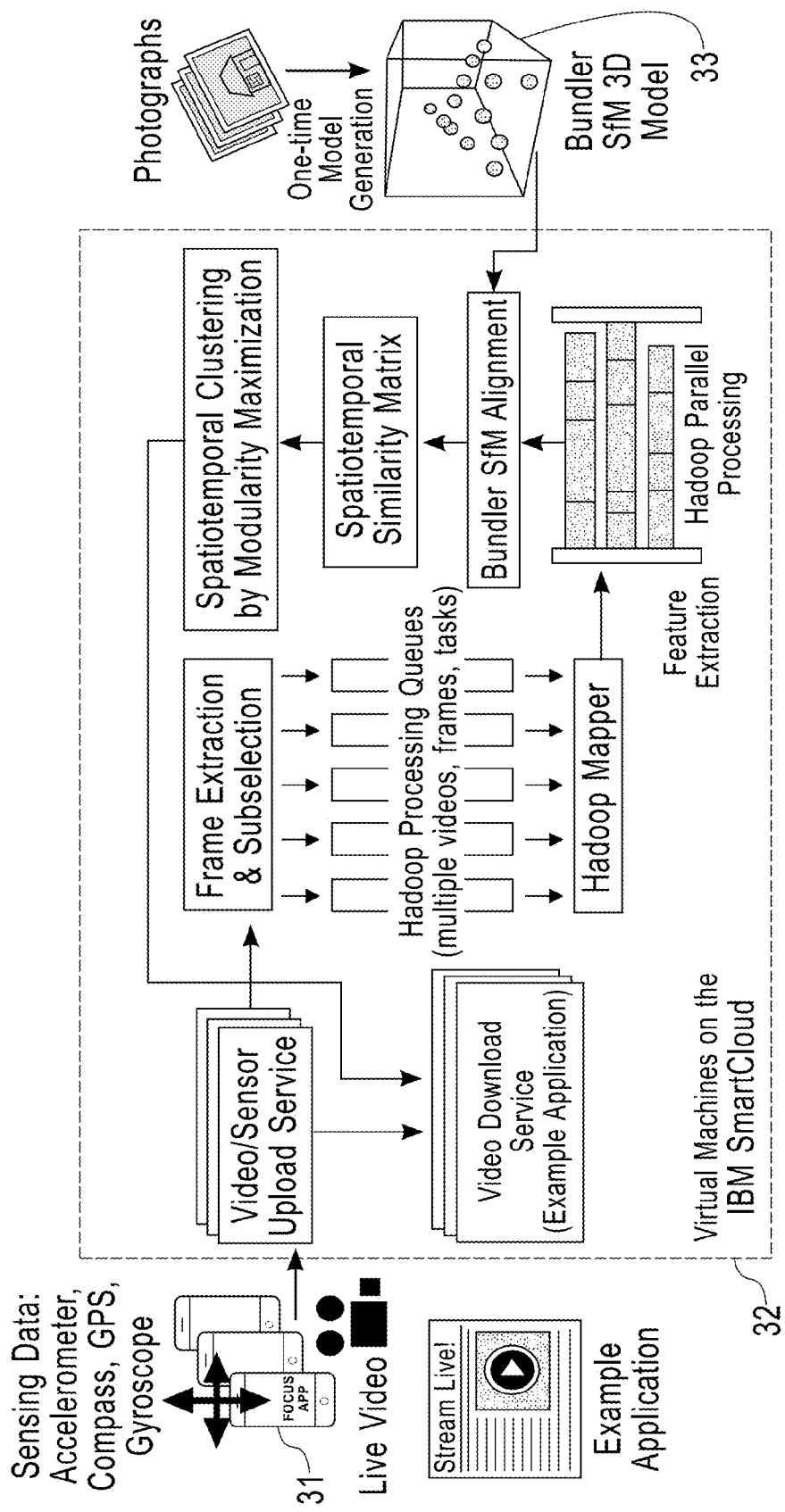
FIG. 3 is a schematic diagram illustrating an architecture for clustering crowdsourced videos by line-of-sight in accordance with exemplary embodiments of the present invention.

FIG. 3 is a schematic diagram illustrating an architecture for clustering crowdsourced videos by line-of-sight in accordance with exemplary embodiments of the present invention. A mobile app may be downloaded and installed on the smartphones of multiple users 31. The mobile app may be deployed, for example, from a mobile application store such as the APP STORE for Apple Inc.'s iOS platform or on the GOGGLE PLAY STORE for the Google Android platform. A distributed cloud service 32 may be established to receive video feeds from the mobile apps deployed to the smartphones 31. The distributed cloud service 32 may be deployed, for example, on the IBM SmartCloud using Hadoop. The app 31 lets users record and upload live video streams annotated with time-synchronized sensor data, from GPS, compass, accelerometer, and gyroscope. The cloud service 32 receives many annotated streams, analyzing each, leveraging Computer Vision and sensing to continuously track the video's line-of-sight. Across multiple streams, across time, the cloud service 32 reasons about line-of-sight/field-of-view, assigning pairwise similarity scores, informing clustering, and ultimately identifying groups of video streams with a common subject.

Computer Vision techniques such as Structure from Motion ("SfM") may be used to generate a 3D model from received image data. An SfM unit 33 may be used to use these techniques to produce the 3D model and provide it to the cloud service 32. The SfM unit may be, for example, a computer processing device implementing the Bundler open source software library that exists to handle SfM processing, however, exemplary embodiments of the present invention are not necessarily bound to this implementation.

Exemplary embodiments of the present invention reconstruct a 3D representation, or model, of a physical space depicted in the received images. The model consists of many points, and may thus be a point cloud in 3D Euclidean space. It is possible to align an image (or video frame) to this model and deduce the image's camera pose, the point-of-origin location and angular orientation of line-of-sight, relative to the model. Multiple alignments to the same model infer line-of-sight rays in a single coordinate space, enabling an analysis of their relative geometry.

The SfM unit 33 may be an open source software package for SfM and may be used both for the initial model construction and later video frame-to-model alignment. While the SfM technique is complex (though powerful and accurate), its usage is straightforward. Users take several photographs of a physical space (while a minimum of four is sufficient, efficacy tends to improve with a much larger number of photos). With these images as input, SfM operates in a pipeline to: (1) extract salient characteristics of a single image, (2) compare these characteristics across images to find shared points of reference, and (3) optimize these reference points, constrained by the well-understood geometry of multiple views, into a reconstructed 3D point cloud. The SfM model may be generated and available in advance (for example, by the operator of a sporting arena). The SfM model may then be used for analysis as live video feeds arrive at the FOCUS cloud service. However, having a pre-established 3D model is not a requirement and exemplary embodiments of the present invention in which no 3D model is pre-determined are described in derail below. In such embodiments, the content of incoming video feeds themselves are used for model generation.

A process for reconstructing a 3D model from 2D images is now discussed. For each image, a set of keypoints is found by computing a feature extractor heuristic. Each keypoint is a 2D <x, y> coordinate that locates a clear point of reference within an image, for example, the peak of a pitched roof or corner of a window. The keypoint is robust, appearing consistently in similar (but not necessarily identical) images. For each keypoint, a feature descriptor is also computed. A feature descriptor may be viewed as a "thumbprint" of the image, capturing its salient characteristics, located at a particular keypoint. A SIFT extractor/descriptor may be used for this purpose.

Across multiple images of the same physical object, there may be shared keypoints with similar feature descriptor values. Thus, for the next stage of the SfM pipeline, N2 pairwise matching may be performed across images, by comparing the feature descriptors of their keypoints. Finally, the true SfM step can be run, performing a nonlinear optimization on these matched keypoints, according to the known properties of perspective transformation in a 3D Euclidean space. Once complete, the output is the 3D model in the form of a point cloud, consisting of a large number of <x, y, z> points. Each 3D point corresponds to 2D keypoints extracted and matched from the original images.

Multiple points may be created from a single image. While the 3D model may be constructed from any number of images, as an example, a 33,000 point model may be created from 47 high resolution photos. Model generation is feasible in both outdoor and indoor spaces, given sufficient light.

After the model has been constructed, newly acquired frames (be they still images or video frames) may be aligned to the model. This step may include an estimation of image pose. The alignment results in an estimate of its relative camera pose, a 3×1 translation vector and a 3×3 rotational matrix of orientation. The resulting 4×4 rotation and translation matrix can be used to construct the equation of a ray, with a point of origin at the camera, through the subject in the center of the view. This ray follows the line-of-sight from the camera, enabling similarity metrics based on view geometry.

Alignment is still feasible even when images are partially occluded, as much of the core "structure" of the stadium (e.g., the rigid stands, buildings, and boundaries captured in the model) may remain visible.

Figure 4:
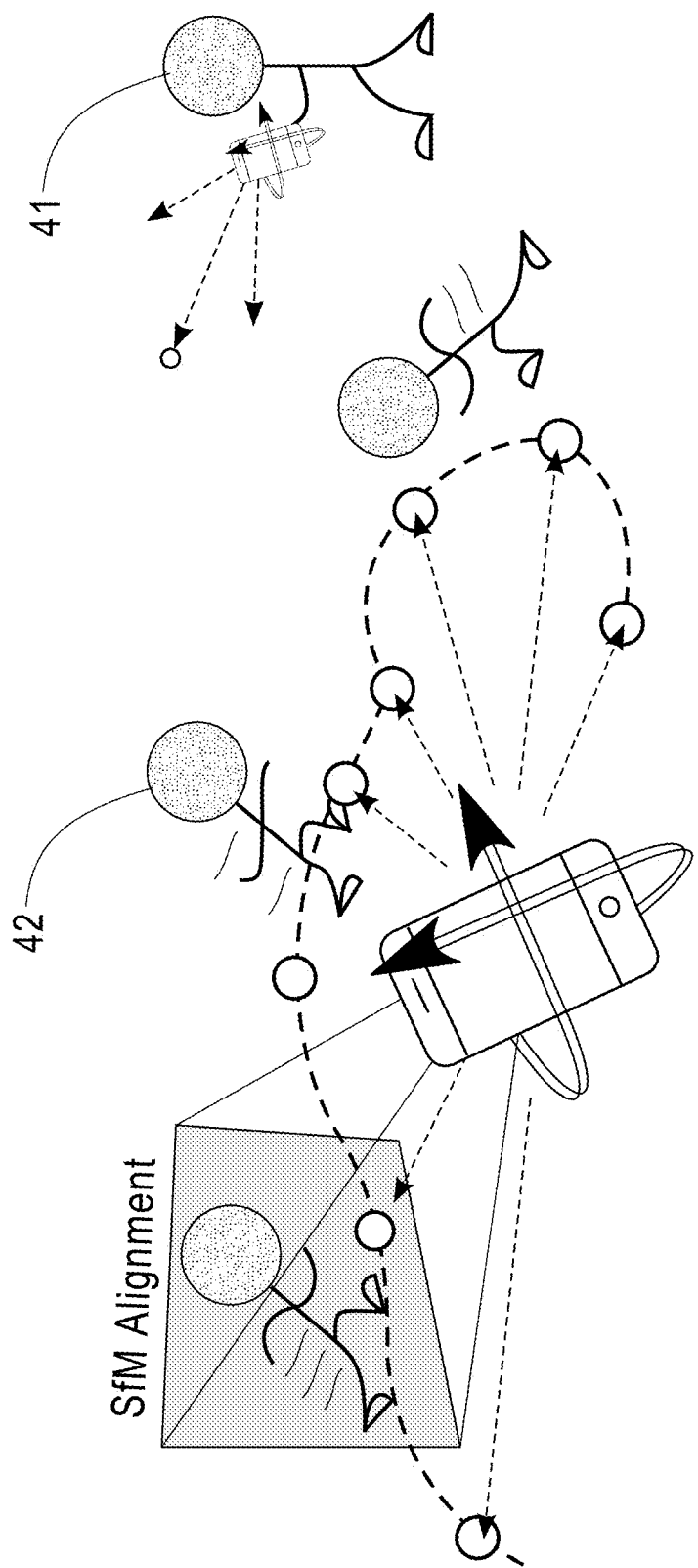
FIG. 4 is an illustration depicting rotational dead reckoning with gyroscope in accordance with exemplary embodiments of the present invention.

Video frame-to-model alignment may be computationally expensive. To reduce the computational burden, it is useful to combine SfM alignment with inputs from smartphone sensing. The inertial gyroscope, present on most modern smartphones, can provide a rotational "diff" across time, in the form of a rotation matrix. By matrix multiplication, this gyroscope-derived rotational matrix may be combined with that of an SfM-estimated camera pose. This process, akin to a rotational "dead reckoning," is depicted in FIG. 4. As errors may accumulate with time, due to inherent noise in the gyroscope sensor, SfM alignment may be periodically rerun, resetting this noise, and maintaining a bounded inaccuracy (relative to the last frame-to-model alignment). Moreover, since SfM alignment itself is prone to some error, this input from gyroscope can be used to inform a hysteresis across multiple alignment attempts.

FIG. 4 is an illustration depicting rotational dead reckoning with gyroscope in accordance with exemplary embodiments of the present invention. As the user 41 follows a moving target 42, a gyroscope tracks a rotational matrix "diff" (forward or in reverse in time) from the closest SfM alignment.

Video frame-to-model alignment can fail for several reasons: if the frame is blurred, poorly lit (too dark), captures sun glare (too bright), the extracted keypoints or feature descriptors have low correspondence with the model, or if the model is too sparse, self-similar, or does not capture the content of the to-be-aligned frame. In a video stream across time, these failures result in alignment "cavities" between successful alignments. To "fill" the cavities, and achieve a continuous alignment, gyroscope-based dead reckoning is especially useful. Note that dead reckoning is possible in either direction, forward or backward with time, from the nearest successful alignment. To dead reckon forward with time, the SfM-derived rotational orientation matrix is multiplied with a gyroscope-derived rotational matrix, accounting for the relative rotational motion accumulated over the time interval from the last alignment. To dead reckon in reverse, the gyroscope rotational matrix must first be inverted. In this inversion, as an invariant, the inverse of a rotation matrix is its transpose.

Other smartphone sensors are also valuable during alignment. GPS, compass, and accelerometer, can be used to estimate a rough camera pose. While these estimates may be prone to error, due substantial sources of noise in each sensor, they may be valuable to confirm outputs from SfM rejecting otherwise-silent alignment failures. In these cases, dead reckoning can be applied to overwrite what may otherwise be an erroneous alignment result.

To cluster video feeds into self-similar groups, exemplary embodiments of the present invention quantify the logical content "similarity." Pairs of videos with a high mutual similarity are likely to be placed into the same cluster. As an invariant, each video will be placed in the cluster with which it has the greatest spatial (from line-of-sight) content similarity, averaged across time, averaged across all other cluster members. To measure similarity, a spatial similarity metric for a pair of video frames my be utilized.

While many spatial similarity metrics may be used for this purpose, one such metric may be a line-of-sight intersection. Here, for each video, for each frame, SfM and gyroscopic tracking may be used to estimate a 3D ray according to the corresponding camera pose, originating from the camera and along the line-of-sight. For a pair of frames viewing the same object of interest, the corresponding rays should intersect, or nearly intersect, through the shared object in view. One possible metric is to consider the shortest distance between these two rays. The resulting line segment must be either (1) between the two points of origin, (2) from the point of origin of one ray to a perpendicular intersection on the other, (3) perpendicular to both rays, or (4) of zero length. Cases (1) and (2) may be treated as having no view similarity where line-of-sight rays diverge. In cases (3) and (4), shorter line segments reflect a nearer intersection, and suggest a greater view similarity. Assuming that the constructed rays are accurate, this metric is not subject to false negatives. For example, for any pair of videos sharing the same content, the length of the line segment between the rays must be small.

Another approach to quantifying similarity is to use point cloud volumetric overlap. Here, the potential for false positives may be reduced by replacing each camera pose ray with a vector terminating at the object in view. Estimation may be facilitated by utilizing additional context from the SfM-derived 3D model structure to at least terminate the vector roughly "on" the model, for example, capturing the ground below the subject and occlusions. Looking down from a stadium grandstand, subterranean intersections would be eliminated. Similarly, intersections in the air, above the field, can be ignored.

As described above, the SfM model may be a point cloud of <x, y, z> coordinates, capturing rigid structures. Instead of only considering the geometry of a line-of-sight ray, exemplary embodiments of the present invention may identify structures captured by a video frame, following the direction of the ray and visible within the field-of-view. A pair of videos may be compared to determine if both capture the same structures. Several techniques from Computer Vision are applicable here. For example, 3D point cloud registration heuristics may be used for estimating boundaries of a mesh surface, and approximating structures. However, as a simpler, computationally-tractable alternative, the model points mutually visible in a pair of video frames may be counted. More shared points suggest greater similarity in their views.

As discussed in more detail below, high similarity values, filling an N×N spatial similarity matrix, encourage placement of these videos in the same cluster. To count the number of common points in the intersecting field-of-views of two videos, first the set of points visible in each field of view may be calculated. The set need only be computed once for a particular video frame. Then, the number of shared points across multiple video frames may be counted by applying a high performance set intersection algorithm. The set of model points visible in a video frame can be found by considering the pyramid-shaped field-of-view, originating from the camera and expanding with distance into the model.

Here SfM and gyroscope-based estimated line-of-sight may be expressed as L(R,t), where R represents a 3×3 rotation matrix, e.g., the 3D angle of orientation. Here t represents a 3×1 vector of translation. $-R^{-1}$ defines the <x, y, z> camera position coordinate, the location in the model from where the video frame was captured. R can be further decomposed as three row vectors, known respectively as RIGHT, UP, and OUT, from the perspective of the camera. To capture the camera's view of the model, a pyramid emerging from the camera position $-R^{-1}t$) and extending in the direction of OUT vector may be formed. The four triangular sides of the pyramid are separated, horizontally and vertically, according to the camera's field-of-view, as may be seen in FIGS. 2A and 2B.

The pyramid-shaped camera view can be abstracted as four planes, all intersecting at the camera position coordinate. Now, to fully describe equations for these planes, only a plane normal vector for each need be found. In order to find four plane normals, the OUT vector may be rotated along the RIGHT and UP vectors, so that the transformed OUT vector becomes perpendicular to one of these planes. Rotation of any 3D vector, along a unit-length 3D vector, is given by Rodrigues' rotation formula. Using this equation, the OUT vector may be rotated along the RIGHT vector by angle±(π/2–vAngle/2) to estimate normals for two planes (top/bottom). Similarly, rotations along the UP vector with angle±(π/2–hAngle/2) results in normals to left and right planes. Here, vAngle and hAngles are taken as parameters for the smartphone camera's field-of-view angle, horizontally and vertically. The signs from these four planar equations for each point in the model may be tested to determine the set of points potentially visible from a particular video frame. Later, set intersections may be performed to estimate similarity between the $N^2$ pairs of time-synchronized frames of N videos. This N×N value table completes the notion of a spatial similarity matrix.

As described above, exemplary embodiments of the present invention define what it means for a pair of video frames to be judged "similar," especially by the intersection of their respective line-of-sight and field-of-view with an SfM-derived 3D model. This notion of "similarity" is a static judgment, based on an instantaneous point in time. In reality, what is interesting is the similarity of a pair of videos, across multiple frames, for some synchronized time interval. This requires a further understanding of what it means for a pair of videos to be "similar," above and beyond the similarity of their constituent frames. A pair of "similar" video streams need not both track the same spot consistently, it is only required that they should both move in a correlated way, consistently capturing the same physical subject, at the same time. Simply, both streams should maintain (instantaneous) similarity with each other across time, but not necessarily have self-similarity from beginning to end. This may be applied to the case of a soccer game: some videos will follow the ball, some will follow a favored player, and others will capture the excitement of the crowd or changes to the scoreboard. These "logical clusters" should map as neatly as possible to the groupings.

To capture the mutual correspondence in a set of N videos with time, the notion of an N×N spatial similarity matrix may be applied across T points in time. For every instant t∈T in a synchronized time interval, the corresponding spatial matrix St may be found and a spatial clustering may be applied, finding some set of groupings Gt={g1, g2, . . . , g|Gt|}, from camera line-of-sight and field-of-view at that instant t. Next, these spatial clustering results may be aggregated into an M=N×N spatialtemporal similarity matrix. Here, let δg(i,j)=1 if streams i and j are both placed into the same spatial cluster g∈Gt. δg(i,j)=0, otherwise.

$$M_{ij} = \sum_{\forall t \in T} \sum_{\forall g \in G_t} \delta_g(i, j)$$

Finally, clustering may be applied again, on M, providing groups of videos matching the notion of spatiotemporal similarity.

While multiple different clustering heuristics may be used, several different options for clustering videos according to spatiotemporal similarity matrix are described herein. For example, variations on k-means clusterings (using non-Euclidean distance metrics) and hierarchical clustering techniques may be used. Clustering techniques may be derived from community identification in complex graphs, such as for social networks, the topology of the Internet, and airport-to-airport flight plans. In each, the objective of clustering is to find communities with (a parameterizable degree of) "closeness" to them. For example, a community in a social network, peer groups with a strong tendency of interconnection, may be clustered from an adjacency matrix. Spatial/spatiotemporal similarity matrix constructions can be considered weighted adjacency matrices, directly capturing a metric of "closeness" respectively, where "closer" videos have a greater degree of spatial similarity, or more consistent spatial similarity across time.

Several clustering approaches require some parameterization of how many clusters are desired (e.g., the k value in k-means clustering). By comparison, community identification via modularity maximization has the appealing property that community boundaries are a function of their modularity, for example, a mathematical measure of network division. A network with high modularity implies that it has high correlation among the members of a cluster and minor correlation with the members of other clusters. Exemplary embodiments of the present invention apply a weighted modularity maximization algorithm. As input, an N×N matrix of "similarity" weights may be provided, either that of spatial or spatiotemporal similarity values. Modularity maximization returns a set of clusters, each a group of videos, matching notions of content similarity.

Many image processing and Computer Vision algorithms may map to a sequence of parallel subtasks. This parallelism may be executed by creating a computing cluster on the IBM SmartCloud. Like Amazon EC2, the IBM SmartCloud is Infrastructure as a Service, supporting on-demand provisioning of computation as virtual machine instances. After predefining a virtual machine image with an operating system and application stack, elastic scalability can be achieved, allocating/deallocating instances to match the current or predicted load.

Each virtual machine image is configured with Apache Hadoop for MapReduce processing. Hadoop is amenable to multimedia processing. Most tasks are easily parallelizable and Hadoop is able to exploit data locality in managing assignment of tasks to computational resources. Virtual machine elastic cloud scale-up/down behavior is informed using the Hadoop queue size. There are several types of MapReduce task that may be used here: (1) base video processing, to include decoding a live video feed and selecting frames for further image-based processing; (2) image feature extraction and computation of feature descriptors for each keypoint; (3) pairwise image feature matching, used when building an initial 3D SfM model; and (4) clustering of similar video feeds. Tasks of multiple types may be active simultaneously.

In certain circumstances, it may be undesirable or infeasible to use SfM-based line-of-sight estimation. For example, video may be captured and shared from locations where no SfM model has been previously built. Further, users may choose to upload video only if very few peers are capturing the same video subject—saving battery life and bandwidth for the user. A lightweight clustering technique, without requiring upload of the video stream, may be used to pre-filter uploads of redundant streams.

Various sensing-only alternative (using, for example, GPS and compass) are described herein. These alternatives may include clustering streams without requiring Computer Vision processing or even access to video sources. Exemplary embodiments of the present invention may be relatively insensitive to compass error. By considering the wide camera field-of-view angle in the direction of line-of-sight, the similarity metric is not substantially impacted by compass errors of comparable angular size.

For each latitude/longitude/compass tuple, the latitude/longitude coordinates may be converted to the rectangular Universal Transverse Mercator (UTM) coordinate system, taking the EASTING and NORTHING value as an <x, y> camera coordinate. From the camera, the compass angle is projected to find a 2D line-of-sight ray. Next, two additional rays are constructed, symmetric to and in the same direction as the line of sight ray, and separated by the horizontal camera field-of-view (hAngle). This construction can be visualized as a triangle emerging from the GPS location of a camera and expanding outward to infinity (with an angle equal to the camera's horizontal field-of-view). A metric for view similarity is computed as the area bounded by intersecting two such regions. Since this area can be infinite, an additional bounding box constraint may be imposed. The resulting metric values are used to populate the spatiotemporal similarity matrix. Clustering proceeds as for SfM-based similarity. To reduce the potential for compass error, gyroscope informs a hysteresis across multiple compass line-of-sight estimates.

To compute the area of intersection (and thus the metric), the intersection of the constraining rays with each other and with the bounding box may be found, forming the vertices of a simple (not-self-intersecting) polygon. The vertices may be ordered according to positive orientation (clockwise) by conversion to polar coordinates and sorting by angle. Next, the polygon area is found by applying the "Surveyor's Formula."

Exemplary embodiments of the present invention may effectively operate in locations where it is feasible to visually reconstruct a sound 3D model of the physical space. The efficacy of model reconstruction may be subject to the properties of the feature detection algorithm. These algorithms may operate by identifying edges and corners of a rigid structure. The inside of stadiums and open areas between buildings, for example, are compliant environments in that they contain large rigid structures, likely to produce many consistent keypoints across multiple images. Even when filled with spectators, the rigid structure of a stadium grandstand is still preserved (and thus are so many keypoints in the SfM model). However, in other contexts, environmental dynamism may hide rigid structures, such as in a parade with large floats. Further, open fields, areas heavily occluded with trees, and tight indoor spaces may present a challenge to SfM, and may yield poor results. The efficacy of SfM may also be dependent on lighting conditions. Dimly lit environments and outdoor environments at dawn or dusk yielding sun glare may be especially challenging.

Accordingly, exemplary embodiments of the present invention may selectively utilize image frames for constructing the 3D model that are most amenable to the model's generation and least susceptible to limitations and complications, such as those discussed above. Leveraging sensory inputs and/or lightweight Computer Vision, it is possible to identify which video frames are likely to be the "best" for further processing. For example, any of accelerometer, gyroscope, or visual inputs can be applied to identify shaken and blurred views. Similarly, simple visual metrics, such a color histogram or spatiograms, may be used in detecting a change in the presence of occlusions. Gyroscope-based dead reckoning may again be used here, making it easy to select, align, and leverage a compliant frame.

In some environments, it is feasible to precompute the SfM 3D model. In a stadium for professional or collegiate sports, for example, an employee or fan taking photographs of the arena, in advance, may be used as input to the Hadoop-based model generation pipeline described above. However, with a goal to streamline practical deployment of the system, the model may be constructed dynamically, using the content of the video streams themselves. Fundamentally, SfM may be able to build a model by leveraging a diversity of perspective across multiple views of the same object: normally achieved by taking photos while moving through a space. A similar diversity may be made available across the various feeds coming into the system. During the bootstrap period, during which sufficient images are gathered and the model is constructed, exemplary embodiments of the present invention may leverage various sensing-only failover techniques, operating at a reduced accuracy until the model is complete.

Model generation may be generated from streams including still images and video clips. In building the model, applications installed on the smartphones and portable devices of users may provide some indication of what images maybe most helpful to construct the desired 3D model, where images from certain key angles are missing. Such an app may make use of GPS and compass, to assist the photographer in tracking where photographs have been and should be taken.

Figure 5:
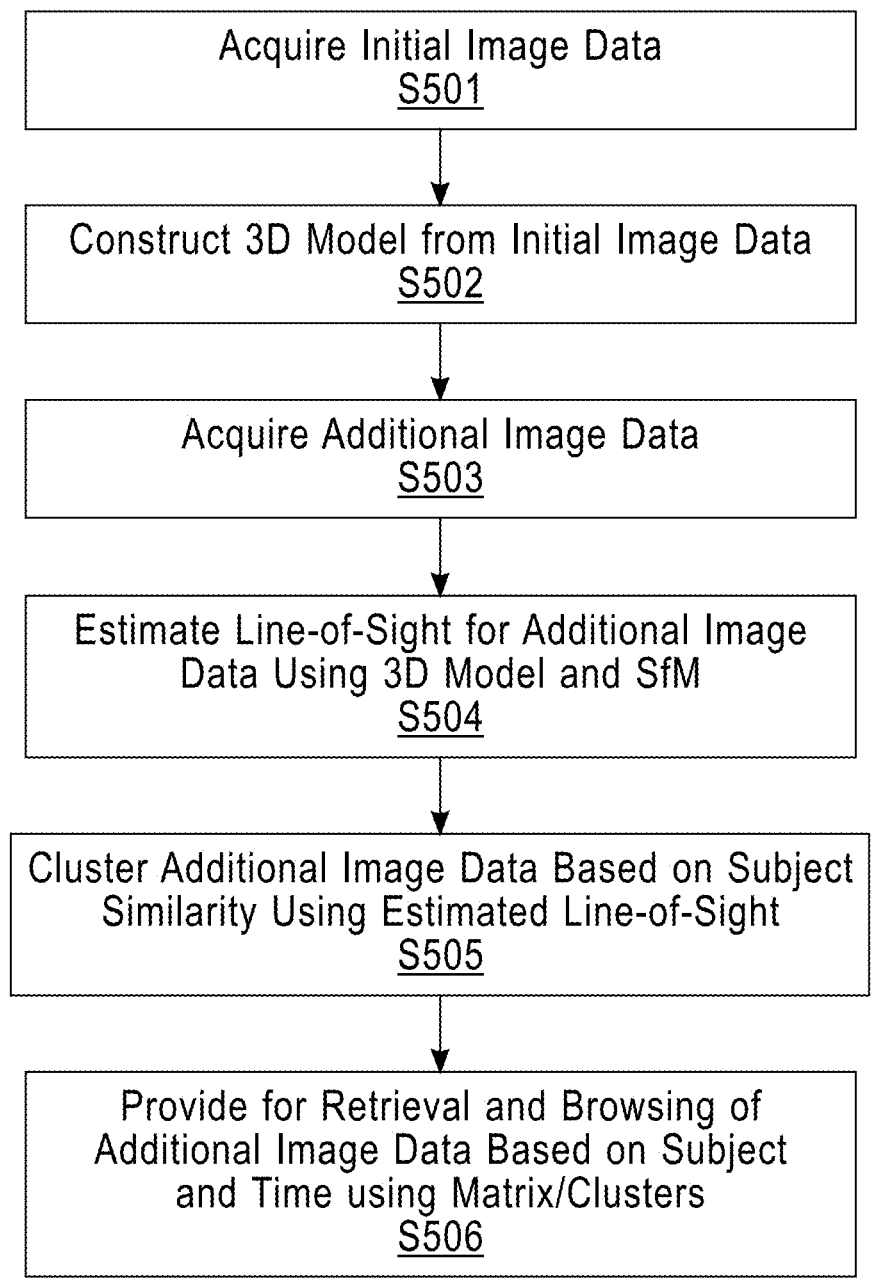
FIG. 5 is a flow chart illustrating an approach for grouping images in accordance with exemplary embodiments of the present invention.
Figure 6:
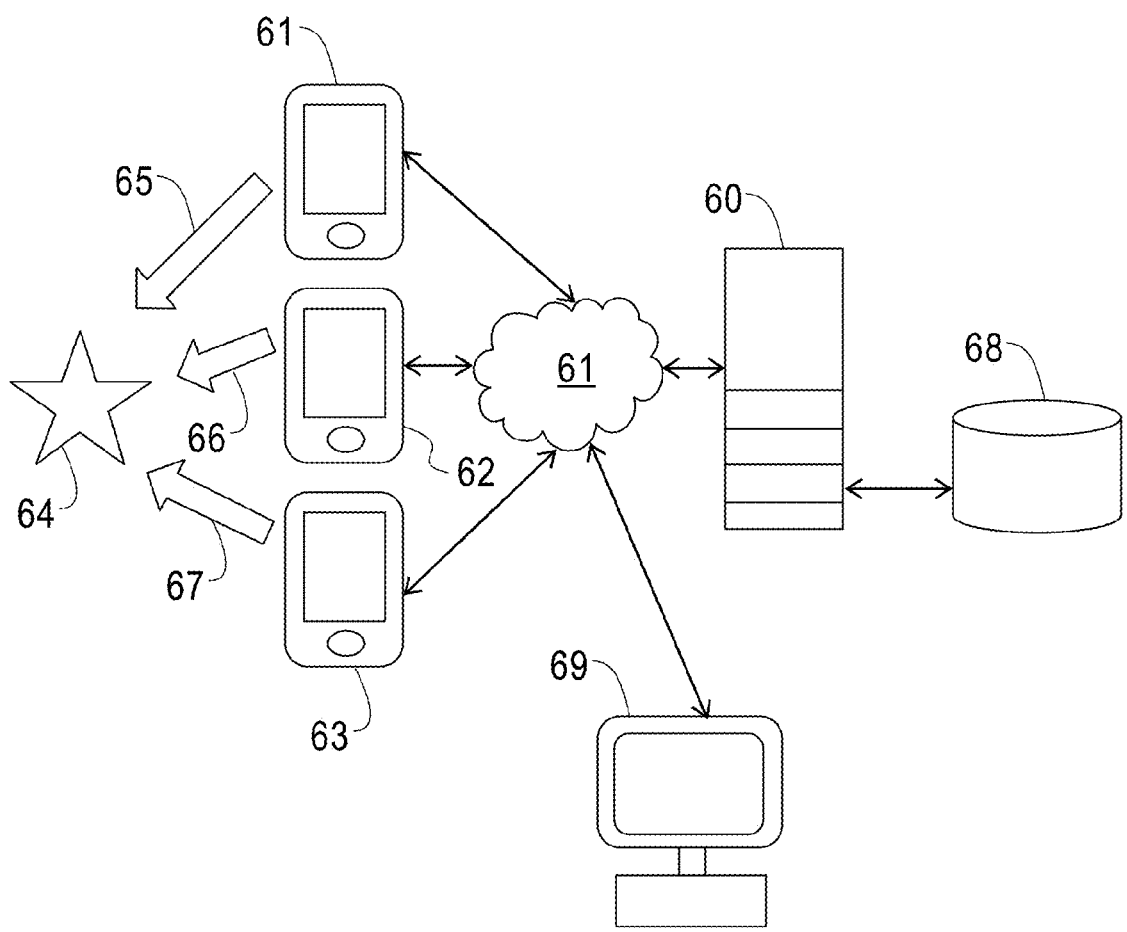
FIG. 6 is a schematic diagram illustrating a system for grouping images in accordance with exemplary embodiments of the present invention.

FIG. 5 is a flow chart illustrating an approach for grouping images in accordance with exemplary embodiments of the present invention. FIG. 6 is a schematic diagram illustrating a system for grouping images in accordance with exemplary embodiments of the present invention. First, initial image data may be received (Step S501). The initial image data may be image data used to construct a 3D model. The initial image data may include still images, video images or a combination of the two. The initial image data may also include surveillance and/or satellite imagery either real-time or pre-captures and, for example, readily available online through sources such as GOOGLE MAPS. The initial image data may be acquired either using a plurality of mobile wireless devices 61 and/or from imaging devices of known and/or fixed locations such as security cameras or television cameras, although actual knowledge of the location of the imaging devices is not required.

Then, a 3D model may be constructed based on the acquired initial image data (Step S502). The 3D model may be constructed either using techniques for Structure from Motion (SfM), where the three-dimensional structure of an object by analyzing local motion signals over time, or by other known techniques. Where available, location and orientation information of the devices used to acquire the initial image data may be used to bolster model generation. Where this information is not available or where it is unreliable, SfM techniques may provide for the generation of the 3D model in the absence of this information, for example, provided that the initial image data includes a sufficient number of images. The sufficient number of images may be, for example, in the order of tens of images. Where available, a 3D model may be pre-constructed without having to rely on any initial image data, for example, by using a 3D scanning camera to model the area of interest.

After the 3D model has been created, additional image data may be received, for example, at a central server 60 (Step S503). The additional image data may also be still images, video images or a mix of the two. The additional image data may be acquired, for example, by the set of mobile wireless devices 61, 62, and 63. The mobile wireless devices may include, for example, smartphones, network-enabled tablet computers, portable computers, WiFi cameras, wearable computers such as GOOGLE GLASS, etc. The mobile devices may be in communication with the server 60, for example, via a mobile wireless network and the Internet 61. The additional image data may be acquired either from the same or different sources that have been used to acquire the initial image data. The additional image data may include images of a common area or event of interest 64 and each item of image data may be acquired from a particular line-of-sight of the corresponding mobile device. For example, a first mobile device 61 may send an image of the item of interest 64 from a first line-of-sight 65. A second mobile device 62 may send an image of the item of interest 64 from a second line-of-sight 66. A third mobile device 63 may send an image of the item of interest 64 from a third line-of-sight 67. All of the image data may be sent via the mobile network/Internet 61 to the server 60.

For example, image data acquired from the mobile wireless devices 61-63 may be part of a continuous image stream with image data obtained prior to the building of the 3D model being used as the initial image data and image data obtained thereafter being used as the additional image data. The initial and additional image data need not be further distinguishable.

A light-of-sight 65-67 of each element of additional image data may then be estimated (Step S504). Computer vision techniques such as SfM designed to analyze visual similarity by line-of-sight may be used to determine a point of view fort each item of acquired image data. This may be accomplished, for example, by treating the additional image data as if it were initial image data and attempting to add the additional image data to the 3D model. However, rather than adding the additional data to the 3D model, exemplary embodiments of the present invention may make note of where within the 3D model the additional image data would go. Thereafter, the additional image data may optionally be added to the 3D model to bolster the model. The SfM processing may be performed, for example, using the server 60.

The additional image data may thereafter be clustered into groups of images with similar subjects (Step S505). This step may be performed, for example, using the approximated line-of sight information. According to one exemplary embodiment of the present invention, clustering may be performed as a series of one-to-one comparisons between pairs of images. The criteria for the comparison may be based on the estimated line-of-sight, for example, by using the line-of-sight information to calculate a 3D field of view for each image and then determining an extent to which the fields of view of two different images overlap in three-dimensions. Accordingly, the resulting clusters may include images of a common subject that do not necessarily share a point of view. For example, multiple images that show a player on a field or a scoreboard from different angles may be grouped into a single cluster.

In clustering the images, a spatiotemporal matrix may be generated to express the various additional images over space and time. In this regard, the spatiotemporal matrix may serve as a metric for gaging the similarity of the additional images. Thus, clustering may be facilitated by the prior generation of the spatiotemporal matrix. However, exemplary embodiments of the present invention do not require that this particular metric be used.

The initial image data, the 3D model, the additional image data, the line-of-sight information, the spatiotemporal matrix information and/or the cluster information may be stored for retrieval within a data storage device 68 connected to the server 60.

Thereafter, exemplary embodiments of the present invention may provide for user-retrieval and browsing of the additional image data (Step S506). In this step, the user may retrieve images based on a desired subject and/or time and may then select to see additional images within the cluster to, for example, see the same subject from alternative angles.

The user-retrieval of the additional images may, for example, be performed using a computer system 69 contacting the server 60, for example, over the Internet 61. The computer system 69 may access the server 60, for example, via a website. However, the computer system 69 may also be a mobile device that accesses the server 60 using a native application installed thereon.

Results of the user's search may reference the additional image data. The search may include one or more keyword terms and these terms may be matched against similar terms provided by those users that provide the initial and/or additional image data. Once the user has discovered the desired cluster of image data, the user may utilize navigational controls provided on the computer system 69 to select a desired line-of-sight from which to view the event or location of interest or to step through one or more images of the same subject from alternative points of view. The server 60 may thereafter display to the user image data of the additional image data that was acquired from the desired line-of-sight on the user's computer system 69. This process may be facilitated by the fact that the additional image data has been tagged in accordance with its line-of-sight information, which may include an angle and distance from a subject of interest.

Accordingly, the value of user-uploaded video is both immense and fragile. YouTube and other sites depend on a haphazard collection of manual tags and machine-mineable comments. Real-time content, prior to the availability of this crowdsourced context, is difficult to index. With the trends towards enhanced wireless data connectivity, improved smartphone battery life, and adoption of the cloud for low-cost, scalable computation, exemplary embodiments of the present invention may provide for widespread distribution of user-uploaded real-time video streams from mobile phones. A system may be employed for analyzing this live content, in real time, finding groups of video streams with a shared subject. Exemplary embodiments of the present invention may be deployed, for example, to enable a crowd-sourced "instant replay," enabling the viewer to inspect multiple angles of a contentious play. More generally, these approaches may be broadly enabling for a variety of next-generation streaming multimedia applications.

Figure 7:
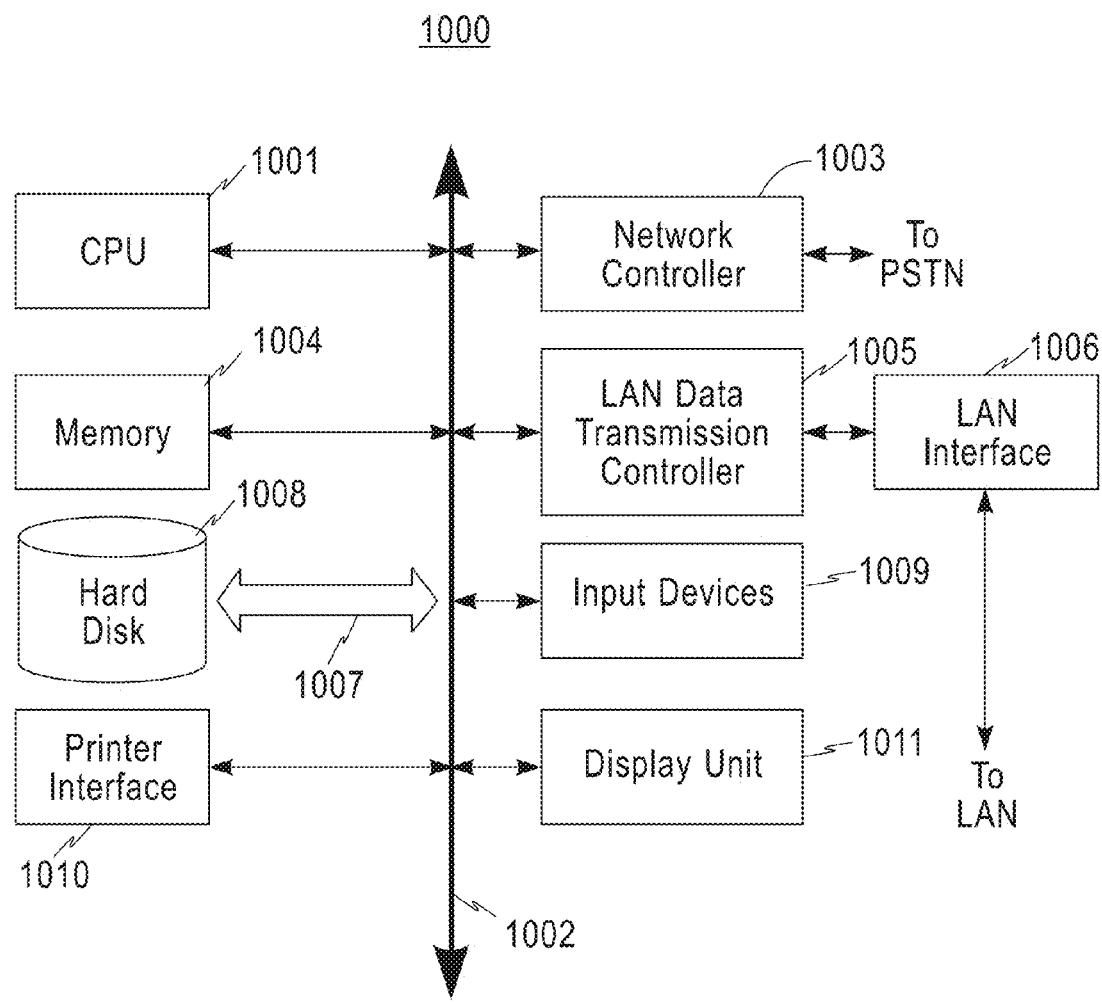
FIG. 7 shows an example of a computer system capable of implementing the method and apparatus according to embodiments of the present disclosure.

FIG. 7 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example; but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for clustering images, comprising:
   acquiring initial image data including a scene of interest;
   constructing a 3D model of the scene of interest based on the acquired initial image data;
   acquiring a plurality of additional images including the scene of interest;
   fitting each of the plurality of additional images to the 3D model;
   estimating a line-of-sight for each of the plurality of additional images based on the corresponding fitting to the 3D model; and
   clustering the plurality of additional images into a plurality of clusters according to the estimated line-of-sight of each of the plurality of additional images,
   wherein the clustering of the plurality of additional images into the plurality of clusters according to the estimated line-of-sight includes:
   estimating a 3D ray for each estimated line-of-sight;
   calculating a shortest distance between each pair of estimated 3D rays; and
   clustering the 3D rays according to the shortest distances,
   wherein calculating a shortest distance between each pair of estimated 3D rays includes analyzing only pairs of 3D rays that converge and calculating a distance of a line segment that connects an origin of a first 3D ray of each pair of 3D rays and intersects a second 3D ray of each pair of 3D rays perpendicularly.

2. The method of claim 1, wherein the 3D model is constructed from the initial image data using structure from motion (SfM) processing.

3. The method of claim 1, wherein the initial image data includes a plurality of still or video images of the scene of interest.

4. The method of claim 3, wherein the plurality of still or video images are acquired by a plurality of different users.

5. The method of claim 1, wherein the plurality of additional images includes a plurality of still or video images of the scene of interest.

6. The method of claim 5, wherein the plurality of still or video images are acquired by a plurality of different users.

7. The method of claim 1, wherein the plurality of additional images is fit to the 3D model using structure from motion (SfM) processing.

8. The method of claim 7, wherein the estimating of the line-of-sight of the plurality of additional images based on the fitting to the 3D model is performed by the SfM processing.

9. The method of claim 1, wherein clustering the plurality of additional images according to the estimated line-of-sight includes:
   establishing a visual metric for content similarity;
   rating discrete images of the additional image data according to the established metric; and
   grouping the discrete images according to closeness of the ratings.

10. The method of claim 1, wherein clustering the plurality of additional images according to the estimated line-of-sight includes:
    calculating a 3D cone or pyramid representing a field-of-view for a plurality of discrete images of the plurality of additional images according to the estimated line-of-sight;
    determining an extent to which the 3D cones or pyramids for the plurality of discrete images overlap; and
    grouping the discrete images according to the calculated extent to which the 3D cones or pyramids for the plurality of discrete images overlap.

11. The method of claim 1, wherein fitting the plurality of additional images to the 3D model is performed entirely based on computer vision techniques.

12. The method of claim 1, wherein fitting the plurality of additional images to the 3D model is performed based on computer vision techniques and sensor data from a plurality of mobile devices used to acquire the plurality of additional images.

13. The method of claim 12, wherein the plurality of mobile devices includes smartphones, tablet computers, or wearable computers.

14. The method of claim 12, wherein the sensor data from the plurality of mobile devices includes gyroscope data, GPS data, compass data, or accelerometer data.

15. The method of claim 14, wherein the gyroscope data is used in fitting the plurality of additional images to the 3D model by performing dead-reckoning in-between interpolation of computer vision-based fitting.

16. The method of claim 1, additionally comprising:
    receiving a user query for image data pertaining to the scene of interest;
    displaying one or more first still or video images of the scene of interest from the plurality of additional images; and
    displaying one or more second still or video images of the scene of interest from the plurality of additional images that have been clustered with the first still or video images.

17. A computer program product for clustering images, the computer program product comprising a non-transitory computer readable storage medium having program code embodied therewith, the program code readable/executable by a computer to:
    acquire an initial plurality of still or video images including a scene of interest;
    acquire an additional plurality of still or video images including the scene of interest;
    transmit the acquired initial plurality of still or video images and the additional plurality of still or video images to a cloud-based server over a mobile data network;
    construct a 3D model of the scene of interest based on the acquired initial plurality of still or video images;
    fit each of the additional plurality of still or video images to the 3D model;

estimate a line-of-sight for each of the additional plurality of still or video images based on the corresponding fitting to the 3D model; and cluster the additional plurality of still or video images into a plurality of clusters according to the estimated line-of-sight of each of the additional plurality of still or video images, wherein the clustering of the additional plurality of still or video images into the plurality of clusters according to the estimated line-of-sight includes:

estimating a pyramid-shaped volume representing a camera angle for each line-of-sight;

counting a number of volumetric points that are commonly within each pair of estimated pyramid-shaped volumes; and clustering the estimated pyramid-shaped volumes according to the number of common volumetric points.

18. The computer program product of claim 17, wherein the 3D model is constructed from the initial plurality of still or video images using structure from motion (SfM) processing the additional plurality of still or video images is fitted to the 3D model, estimating a line-of-sight of the additional plurality of still or video images based on the fitting to the 3D model, using the SIM processing.

* * * * *